May 21, 1929.  E. A. SPERRY  1,714,145
CRANKLESS ENGINE
Filed Nov. 14, 1922  2 Sheets-Sheet 1
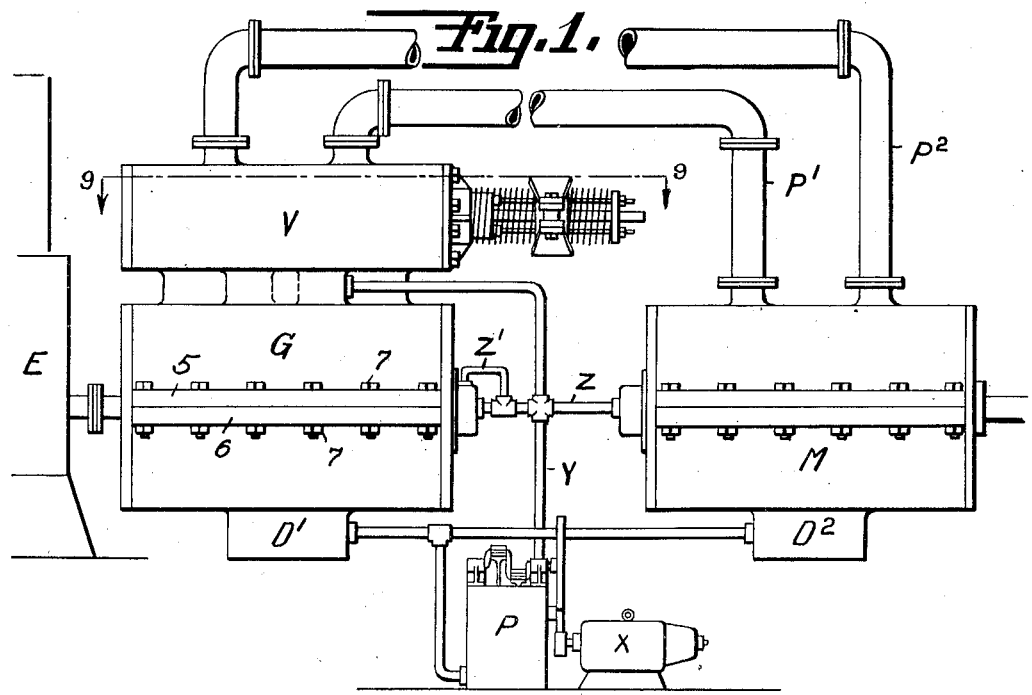
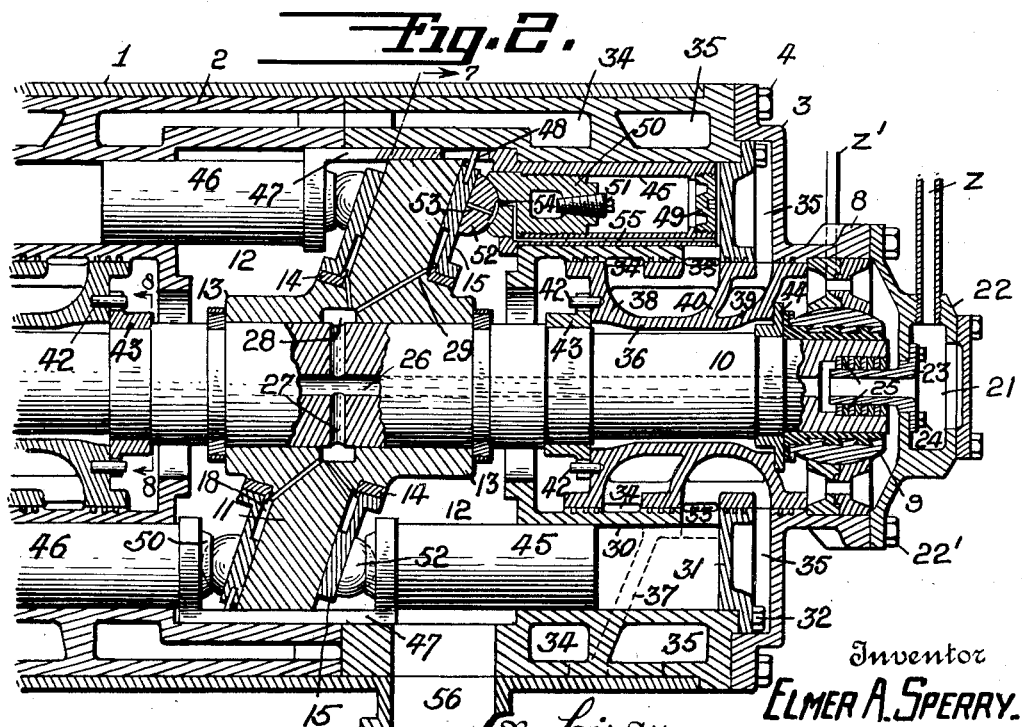
Inventor
ELMER A. SPERRY.
By his Attorney
Herbert H. Thompson

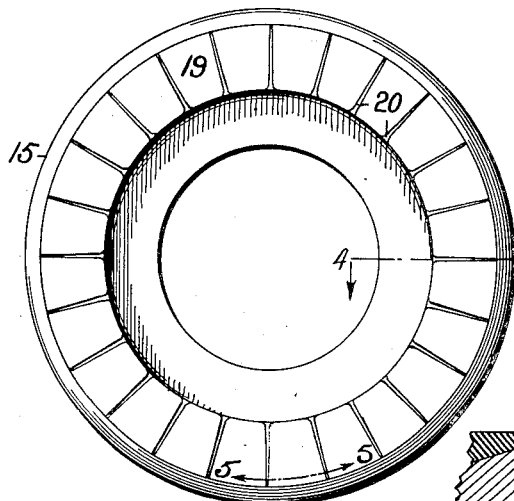
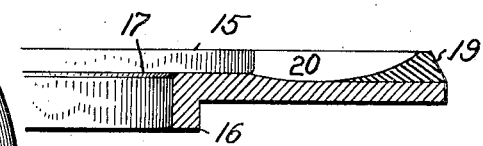
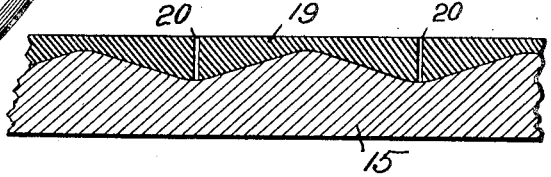
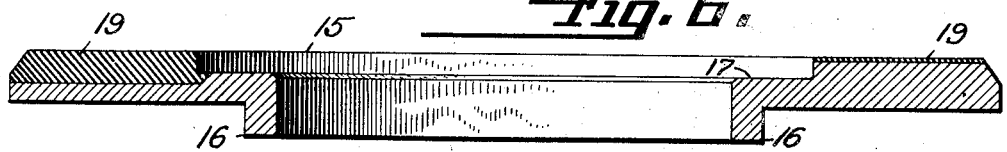
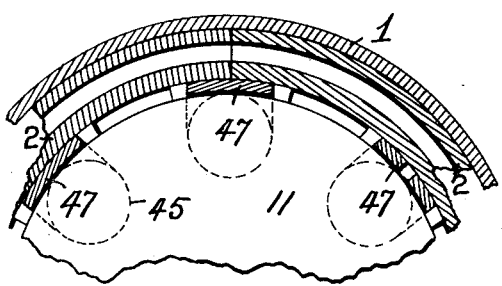
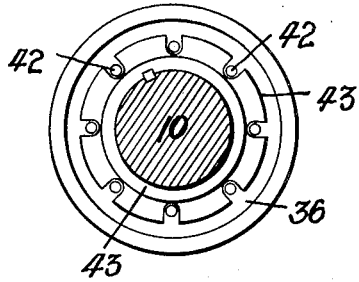

Patented May 21, 1929.

1,714,145

UNITED STATES PATENT OFFICE.

ELMER A. SPERRY, OF BROOKLYN, NEW YORK, ASSIGNOR TO THE SPERRY DEVELOPMENT COMPANY, OF DOVER, DELAWARE, A CORPORATION OF NEW YORK.

CRANKLESS ENGINE.

Application filed November 14, 1922. Serial No. 600,829.

This invention relates to crankless engines, and has for its object the provision of an improved engine of this character. More specifically, my invention relates to a new and highly efficient power transmission system, in which a suitable non-elastic fluid, under pressure from a crankless engine, serving as a generator, is employed as the power transmitting medium to drive a second crankless engine which serves as a motor.

The present application is a continuation in part of my pending application, Serial No. 583,083, filed August 21, 1922.

Heretofore, in engines of this type, it has been customary to provide a slipper block of various types between each of the respective pistons, and the swashplate or slant, which arrangement required a multiplicity of parts, means for keeping the slipper blocks in their relative positions, and frequently the provision of other means to secure efficient operation. In the present invention, I have reduced the number of parts, and greatly simplified the construction of said engine by providing a single slipper unit, in the form of a ring, in place of the several slipper blocks, resulting in more efficient operation, and a more rugged structure. In such a construction, a bearing of Babbitt or other suitable metal may be advantageously employed, such for example as is shown in the pending application of Alexander E. Schein, Serial No. 537,709, filed February 20, 1922. The surface of said slipper ring may be provided with means for building up an oil film between the slipper ring and the swashplate and such means are provided to cooperate with a novel lubricating oil feed.

It has also been the previous practice to provide rotary valves in said engines for controlling the passage of oil thereto and therefrom, which valves were keyed or otherwise rigidly secured to the main engine shaft which carried the slant. By this arrangement, the valves were subjected to all of the bending strains and stresses of the shaft, or the so-called wobbling of the shaft, which soon caused the valves to leak and otherwise to function improperly. These difficulties have been overcome in the present case by the provision of floating rotary valves, that is, valves independent of but driven by the main shaft through a loose connection.

In accordance with the general practice relating to crankless engines, piston units are employed formed of two pistons united by a yoke. As the piston speed increases, the bending moments about this yoke become very great, and in order to prevent resultant injury therefrom, a novel means of support for the yoke is provided.

My invention will be better understood from the following description taken in connection with the accompanying drawings, and its scope will be pointed out in the appended claims.

In the accompanying drawings, illustrating what I now consider a preferred form of my invention, Fig. 1 is a diagrammatic view illustrating an operative arrangement of the several units employed in carrying out my invention, Fig. 2 is a vertical section of my improved crankless engine, one of the pistons being shown in section taken on a different line to more clearly show its construction and to avoid a multiplicity of drawings, Fig. 3 is a plan view of one form of my improved slipper ring showing the face making sliding contact with the swashplate having babbitted bearing sections, Fig. 4 is a section taken on the line 4—4 of Fig. 3, Fig. 5 is a section taken on the line 5—5 of Fig. 3, Fig. 6 is a section taken on a diameter of Fig. 3, Fig. 7 is a section taken on the line 7—7 of Fig. 2, with the swashplate in elevation and the location of the pistons indicated in dash lines, with parts broken away, to illustrate the arrangement for reinforcing the piston yokes, Fig. 8 is a view taken on the line 8—8 of Fig. 2 showing the connection between the rotating valve and the engine shaft.

Referring now to the drawings, in Fig. 1 is shown a prime mover E, arranged to drive a crankless engine G, which is employed as a generator for transmitting power by a suitable non-elastic fluid, such as oil, to a crankless engine M, which is employed as a motor. As previously indicated, the engines G and M may be identical in the present system, and the novel features therein will be pointed out in detail hereinafter. Said fluid is transmitted from one of said engines to the other through two passages or pipes $P_1$ and $P_2$ which are controlled by a valve V. This valve is arranged to connect either passage $P_1$ or $P_2$ with the pressure side of the generator, and the remaining one of said passages with the suction side of the generator, whereby fluid under pressure may pass from the generator to the motor through one of the passages and return to the generator from the motor through the other passage, the direction of the motor being controlled by the passage used to deliver the fluid under pressure to the motor. This valve also controls the quantity of fluid permitted to flow through said passages, thereby controlling the speed of the motor. To illustrate, the generator keeps the fluid in its pressure side under a constant pressure, when driven at a constant speed. If in this case, only 20% of the fluid is allowed to pass to the motor, it is clear that the speed of the motor will be one-fifth of that of the generator. Therefore, by controlling the quantity of said fluid passing to the motor, any motor speed from a minimum to the maximum speed of one to one with the generator may be obtained. As will later appear herein, one surface of the slipper ring is lubricated by means of a passage extending axially through the engine shaft, and the other surface of said ring is lubricated by passages within the piston. Having served its purpose, the lubricant passes from the the surfaces of said ring into the swashplate chamber. To remove this oil, the engines are provided with drains $D_1$ and $D_2$ respectively, from which the oil is pumped by a pump P, which may be driven by a motor X, to the suction side of the generator through a pipe Y. The lubricant for the shaft passages may also be supplied from this source by connecting the pipe Y to said passages by a line Z, as shown in Fig. 1.

Having set forth the general arrangement and operation of the several units employed, the engines G and M will be described in detail. As above stated, the construction of these engines is identical. Since both ends of such an engine are structurally the same, but one end need be described. As shown in Fig. 2, said engine is formed with a cylindrical casing 1, into which is fitted an inner shell 2, the open end being closed by a plate 3 which is suitably secured to the casing 1 and shell 2, such as by bolts 4, to form a unitary structure. The casing 1 may be in two parts cut longitudinally, formed at their edges with flanges 5 and 6 respectively, and secured to each other by a plurality of bolts 7, as shown in Fig. 1, for convenience in assembling the unit. The plate 3 has a central opening surrounded by an outwardly extending cylindrical flange 8 to form a housing for a thrust bearing 9 on the shaft 10 of the engine. A swashplate having the form of an oblique section of a circular cylinder, within a swashplate chamber 12, formed with a central boss 13, is rigidly mounted upon the shaft 10, in any suitable manner, preferably at a point midway from the ends of the engine, to rotate with the shaft. The boss 13 has a cut away portion at right angles to the surface of the swashplate on which is fixed a flanged ring 14, preferably of bronze, on which is rotatably mounted a slipper ring 15, preferably of steel. In using the term "slipper ring" herein, I desire it to be understood as meaning a unit preferably ring-shaped concentrically mounted with respect to the swashplate shaft, with its surface parallel and in sliding engagement with the swashplate surface to act as a slipper block, as distinguished from a plurality of slipper blocks, such as are shown in my copending application, Serial No. 583,083, above referred to. The construction of my slipper ring will be better understood by referring to Figs. 3 to 6 inclusive, from which it will be seen that said ring in one of its forms is provided with a shoulder 16 around its central opening to form a better riding surface on the fixed ring 14. It will also be seen that while that portion of the ring surface near its outer edge is in engagement with the swashplate 11, a small portion of the surface adjacent the swashplate near the shoulder 16 has been cut away as indicated at 17 in Fig. 6, thereby forming a small chamber 18 between said swashplate and said ring around the central opening of the latter, which chamber is employed for lubrication, as will hereinafter appear. While my slipper ring may be formed wholly of steel, or other suitable metal, the thick portion thereof, that is, that part of the ring surface engaging the swashplate is completely covered with so-called frictionless material, or may be formed with a plurality of babbitted sections 19, arranged radially and separated by oil passages 20 on the surface of said ring. As shown in Fig. 3, these passages may be widest at their ends nearest the center of ring 15 and taper outwardly where they are left open or closed, the latter construction being preferred. Also, as shown in Fig. 4, these passages may also be deepest at their widest portions and rise to the surface as they approach their narrower or closed ends. In any event it is preferable that they stop just short of the outer periphery. From Fig. 5 it will be seen that the sections 19 are thickest adjacent said lubricating passages 20 and when viewed in cross-section may be more or less concave or slanting on their base surface. The sections when thus designed have a greater thickness of babbitt on the "on" (or entering) side of the bearing than on the "off" side, so that when the slipper ring is in operation, and a lubricant is fed into said passages, as will later appear, a wedge-shaped oil film will be built up between said sections and the swashplate. The babbitt, being thicker near the entering edge of said section than further back, will compress to a greater degree, and hence will aid the lubricant to enter at this point, or on this line, thereby building up a wedge-shaped oil film between it and said swashplate and reducing and holding the frictional coefficient to a very low value. Normally the base of the sections is formed ratchetwise all having a common inclination as described in the above mentioned application, Serial #537,709 for unidirectional rotation as in generator G, but for the reversible rotation of motor M, the special arrangement shown in Fig. 5 is employed wherein both edges of the sections 19 adjacent the passages 20 have been made thicker so that they may efficiently function in either direction of rotation of the swashplate. While I have referred to these sections as being of babbitt, any substance having a low modulus of elasticity with reference to the ring 15 may be employed.

Under one lubrication system, a suitable lubricant is forced under pressure into the passages 20 from the chamber 18 through a plurality of passages connected with the pipe Z. As shown in Fig. 2, the pipe Z communicates with a chamber 21 formed within a member 22 which is secured to the flange 8 by bolts 22' and forms a cover for the opening formed by said flange. The end of shaft 10 carrying the bearing 9 has been counterbored to receive a hollow flanged thimble 23 in communication with chamber 21 and secured to the cover 22 by screws 24. A plurality of suitable packing rings 25 are interposed between the member 23 and shaft 10 within the said counterbored portion. A passage 26 extending axially through the shaft 10 communicates with the hollow member 23. A passage 27 located on a diameter of said shaft, preferably midway of the swashplate, communicates with passage 26. The swashplate 11 is provided with a chamber 28 in communication with the passage 27, which chamber communicates with the chamber 18 through passage 29 within the swashplate. It will therefore be seen that oil from the pump P may lubricate the slipper ring surfaces through the pipes Y and Z, chamber 21, member 23, passages 26 and 27, chamber 28, passages 29 and chambers 18. The oil in leaving chambers 18, presses its way outwardly into grooves 20 but also directly out on the friction face of each ring. The film thus directly flooding the face of the rings will naturally be the thickest and penetrate furthest on the non-pressure areas or sectors of the rings. These are known to be always ½ of each ring, the other half being under heavy pressure under loaded conditions. So the sector is always well flooded with oil, presently to become useful in the constant circular progression of these areas as they rapidly follow each other around and around the ring face keeping pace with the constantly changing phase of oscillation as they are reciprocated by the swashplate, a constantly progressive group of ½ of the pistons going one way and the other half going the other way.

The piston cylinders are formed by a cylindrical member 30, concentrically located with respect to shaft 10, but free thereof, and the inner walls of shell 2. The member 30 is formed with a flange 31, located at right angles to the axis of said member, which flange forms the closed end of the piston cylinders, and is the means employed for securing said member in position. As shown, the flange 31 may be secured to the shell 2 by bolts 32. The member 30 is provided with an opening 33 located at the rear end of the cylinder so formed. The shell 2 is formed with two oil passages 34 and 35 which are arranged to be alternately connected to the cylinder opening 33 by a rotating valve 36. The passages 34 and 35 extend around the piston cylinder, being separated by a diagonal wall as indicated by dotted lines at 37, to the inner side of the member 30, by which arrangement the passages 34 and 35 are located adjacent the cylinder port 33 on opposite sides thereof. The valve 36 is cylindrical in shape, concentrically located with respect to shaft 10, but free thereof. Said valve is formed on its exterior surface with two walls 38 and 39 arranged to bridge the passages 34 and 35, which walls are separated by an intermediate wall 40, running diagonally on the surface of said valve, so that when said valve rotates, the wall 40 will alternately connect the passages 34 and 35 with the port 33, in a manner readily understood. Suitable non-leakage rings are provided on the members 30 and 3 to prevent leakage from said valve. Said valve is driven by the shaft 10 through a loose connection, whereby the valve is not subjected to the wobbling of the shaft. This connection comprises a plurality of fixed pins 42 carried at one end of the valve 36, arranged to engage a toothed disc 43 fixed on the shaft 10, best illustrated in Fig. 8. Adjacent the opposite end of said valve, a fixed collar 44 is carried by the shaft 10 to close the inner side of the housing for bearing 9. Lubrication for this bearing is provided through a passage Z' leading from the pipe Z as shown in Fig. 1.

The piston units are formed of a pair of pistons 45 and 46 united by a yoke 47. As the bending moments on this yoke increase with the speed of the piston, in order to reinforce the yoke, the inner side of the yoke has been made concave, corresponding to the curvature of the swashplate, and arranged in sliding contact therewith so that it will be supported on this side by the swashplate. The opposite side of the yoke corresponds to the curvature of the inner wall of shell 2, by which arrangement, the yoke is slidably clamped between the swashplate 11 and the shell 2, best illustrated in Fig. 7. To prevent the rotation of the slipper ring 15 with the swashplate 11, the yoke 47 has been slotted to receive a pin 48 fixed on the slipper ring.

The pistons 45 and 46 are preferably formed of a hollow cylinder, closed at one end by a member 49 screwed into said cylinder to form the piston face. The opposite end of the piston is closed by a threaded cup member 50 having a spherically depressed seat on its outer face, and which is locked in position by a tapered lock nut 51. The connection between the piston and the slipper ring 15 is made through a universal joint, comprising a ball 52 seated on the member 50, and having a flat surface in slidable contact with said slipper ring. The ball is provided with a plurality of radial passages, of which but one 53 is visible, extending from its flat surface to a small well 54 located on its spherical back. A passage 55 extends from the spherical depression on member 50 through the wall of the piston to its face, so that oil may flow from the piston cylinder to said seat and to the flat surface of the ball 52 and thereby lubricate the spherical and flat surfaces of said ball in a manner readily understood.

In view of the foregoing detailed description of my engine, a brief statement of its operation is deemed sufficient. When the engine is employed as a generator, the shaft 10 is driven by a suitable prime mover, usually in one direction, and fluid may enter the piston cylinders through the passage 34 and be exhausted therefrom under pressure through the passage 35. However, when my engine is employed as a motor, the shaft 10 is driven by fluid under pressure from the generator, in either direction and at various speeds. In one case, fluid under pressure may enter the piston cylinders through passage 34 and be exhausted therefrom through the passage 35, and in another case, the opposite condition may exist.

Obviously, oil will accumulate in the swashplate chamber 12 from the lubrication of the slipper ring 15 through pipe Z and from the lubrication of the balls 52 as described. To take care of this condition, a passage 56 connects the swashplate chamber 12 with the receptacle D', or D., from which the oil is pumped by the pump P as above described.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention what I claim and desire to secure by Letters Patent is:

1. A crankless engine comprising a shaft, a swashplate mounted thereon, a rotatable slipper ring adjacent said swashplate in slidable engagement therewith, a plurality of pistons, members interposed between each of said respective pistons universally pivoted thereon and said slipper ring making slidable contact therewith, said ring having a plurality of lubricating grooves on its surface adjacent the swashplate, and means for holding said ring from revolving so as to cause relative rotation between it and said swashplate.

2. In a crankless engine, the combination of a rotatable shaft, a swashplate mounted thereon, a rotatable slipper ring adjacent said swashplate and parallel thereto having a plurality of grooves on the surface adjacent the swashplate and a plurality of metal sections on said surface having a lesser modulus of elasticity than said ring, and means for holding said ring from revolving so as to cause relative rotation between it and said swashplate.

3. In a crankless engine, the combination of a rotatable shaft, a swashplate mounted thereon, a slipper ring in slidable contact with said swashplate mounted to permit relative movement therebetween, said ring having a plurality of grooves on the surface thereof adjacent said swashplate, and means for feeding a lubricant into said grooves.

4. In a crankless engine, the combination of a rotatable shaft, a swashplate mounted thereon, a slipper ring adjacent said swashplate and parallel thereto mounted to permit relative rotation between it and said swashplate, said ring having a raised portion of uniform thickness near its periphery making slidable contact with said swashplate, that part of said ring between its inner edge and said raised portion forming a chamber between said ring and swashplate, and means for feeding a lubricant into said chamber.

5. In a crankless engine, the combination of a rotatable shaft, a swashplate mounted thereon, a slipper ring adjacent said swashplate and parallel thereto mounted to permit relative rotation between it and said swashplate, said ring having a raised portion of uniform thickness near its periphery making sliding contact with said swashplate, that part of said ring between its inner edge and said raised portion forming a chamber between said ring and swashplate, a plurality of radial grooves on said raised portion extending from said chamber to the outer edge of said raised portion and means for feeding a lubricant into said chamber and grooves.

6. In a crankless engine, the combination of a rotatable shaft, a swashplate mounted thereon, a slipper ring in slidable contact with said swashplate mounted to permit relative rotation therebetween and means for feeding a lubricant outwardly from said shaft between said ring and swashplate to the periphery of said ring.

7. In a crankless engine, the combination of a rotatable shaft having a longitudinal passage therein, means for feeding a lubricant to said passage, a swashplate mounted on said shaft, a slipper ring in slidable contact with said swashplate mounted to permit relative movement therebetween, and means connecting with said passage for feeding the lubricant between said ring and said swashplate.

8. In a crankless engine, the combination of a rotatable shaft having a longitudinal passage therein, means for feeding a lubricant to said passage, a swashplate mounted on said shaft, a slipper ring in slidable contact with said swashplate mounted to permit relative movement therebetween, said swashplate having passages connecting with said shaft passage for feeding the lubricant between said ring and said swashplate.

9. In a crankless engine, the combination of a rotatable shaft having a longitudinal passage therein, means for feeding a lubricant thereto, a swashplate mounted on said shaft, a slipper ring in slidable contact with said swashplate mounted to permit relative movement therebetween, said ring having a plurality of radial grooves on its surface adjacent said swashplate, and means connecting with said passage for feeding the lubricant into said groove.

10. In a crankless engine, the combination of a rotatable shaft having a longitudinal passage therein, means for feeding a lubricant thereto, a swashplate mounted on said shaft, a slipper ring adjacent said swashplate and parallel thereto mounted to permit relative rotation between it and said swashplate, said ring having a raised portion of uniform thickness near its outer edge making sliding contact with said swashplate, that part of said ring between its inner edge and said raised portion forming a chamber between said ring and swashplate and passages in said shaft and swashplate connecting said longitudinal passage with said chamber.

11. In a crankless engine, the combination of a rotatable shaft, a swashplate mounted thereon, a slipper ring in slidable contact with said swashplate mounted to permit relative movement therebetween, said ring having on the surface thereof adjacent said swashplate a plurality of sections subject to the wedging action of the lubricant, each section being composed of a metal having a much less modulus of elasticity than the ring and means for feeding a lubricant between said ring and said swashplate.

12. In a crankless engine, the combination of a rotatable shaft, a swashplate mounted thereon, a slipper ring in slidable contact with said swashplate mounted to permit relative movement therebetween, said ring having adjacent said swashplate a babbitted bearing surface having a plurality of oil grooves therethrough, the thickness of the babbitt of said surface being sufficient where the oil wedges between the same and said swashplate to provide by the compression of the babbitt, a sufficient space for the entering oil film to maintain the film across said surface, and means for feeding oil to said grooves.

13. In a crankless engine, the combination of a rotatable shaft, a swashplate mounted thereon, a slipper ring in slidable contact with said swashplate mounted to permit relative movement between it and said swashplate, and a plurality of pistons arranged to cooperate with said ring, each of said pistons having a hemispherical depressed surface on its end adjacent said ring, and longitudinal oil passages extending from said depressed surface to the opposite end of the piston located within the walls thereof.

14. In a crankless engine, the combination of a rotatable shaft, a swashplate mounted thereon, a slipper ring in slidable contact with said swashplate mounted to permit relative movement between it and said swashplate, a plurality of pistons having hemispherical depressions on their ends adjacent said ring, a ball member seated in each of said depressions having a flat surface in slidable contact with said ring, said ball member having oil passages extending from its flat surface to its spherical back surface, and longitudinal oil passages within the piston walls extending from the spherical depression thereon to its opposite end whereby oil from the piston cylinder may lubricate the flat and spherical surfaces of said ball member.

15. In a crankless engine comprising a swashplate and a plurality of piston units in operative engagement therewith, each of said units comprising a yoke and two pistons located on opposite sides of said swashplate coupled together by said yoke, the combination of supporting means for said yoke to prevent the bending thereof.

16. In a crankless engine comprising a swashplate and a plurality of piston units in operative engagement therewith, each of said units comprising a yoke and two pistons located on opposite sides of said swashplate coupled together by said yoke, the combination of means located on opposite sides of said yoke to prevent the bending thereof.

17. In a crankless engine, the combination of a casing, a rotatable shaft, a swashplate thereon, a plurality of piston units engaging said swashplates, each of said units comprising a yoke and two pistons located on opposite sides of said swashplate coupled together by said yoke, said yoke being supported on one side by the peripheral surface of said swashplate and on the opposite side by said casing to prevent the bending of said yoke.

18. In a crankless engine, the combination of a rotatable shaft, a swashplate mounted thereon, a slipper ring adjacent said swashplate and parallel thereto, mounted to permit relative rotation between it and said swashplate, the inner diameter of the ring making an oil-tight joint with a suitable portion of the swashplate, and means for feeding lubricant between the swashplate and ring at a point near such oil-tight joint.

19. In a crankless engine, the combination of a rotatable shaft, a swashplate mounted thereon and having a friction face, a thrust bearing ring in engagement with said friction face, a plurality of pistons distributed around the axis of said shaft and adapted to engage said ring at a plurality of points, and means for supplying oil to said ring and said swashplate, said ring being on one side under pressure transmitted by said swashplate and without pressure at the opposite side to cause rocking of said ring relative to said swashplate and permit entry of oil between said ring and swashplate.

In testimony whereof I have affixed my signature.

ELMER A. SPERRY.